H. A. TUTTLE.
REVERSING GEARING.
APPLICATION FILED MAY 26, 1911.

1,168,762.

Patented Jan. 18, 1916.
4 SHEETS—SHEET 3.

Witnesses
H. B. Davis
J. L. O'Neill

Inventor
Henry A. Tuttle

H. A. TUTTLE.
REVERSING GEARING.
APPLICATION FILED MAY 26, 1911.

1,168,762. Patented Jan. 18, 1916.
4 SHEETS—SHEET 4.

Fig. 6

Witnesses
H. B. Davis.
J. L. O'Neill.

Inventor
Henry A. Tuttle
by Prays & Harriman
Attys

UNITED STATES PATENT OFFICE.

HENRY A. TUTTLE, OF TAUNTON, MASSACHUSETTS, ASSIGNOR TO EVANS STAMPING & PLATING COMPANY, OF TAUNTON, MASSACHUSETTS, A CORPORATION OF MASSACHUSETTS.

REVERSING-GEARING.

1,168,762.  Specification of Letters Patent.  Patented Jan. 18, 1916.

Application filed May 26, 1911. Serial No. 629,596.

*To all whom it may concern:*

Be it known that I, HENRY A. TUTTLE, a citizen of the United States, residing at Taunton, in the county of Bristol and State of Massachusetts, have invented an Improvement in Reversing-Gearing, of which the following is a specification.

This invention relates to reversing-gearing connecting a continuously rotating shaft with another shaft, whereby the latter may be driven forward or backward or may remain idle, and is intended as an improvement upon the reversing gearing shown in Letters Patent #901,664, dated October 20, 1908.

In said patent an inclosing-case is provided in which are arranged a spur-gear on the driving-shaft, several pinions engaging said spur-gear, and an internal-gear engaging said pinions, and fitting the interior of the case, and the outer end wall of the case through which the driving-shaft and hub of the spur-gear are extended, and which bear the supports for the pinions is made as a separate plate which is attached to the cylindrical body of the case. In order to provide a smooth working device it is necessary that all the gear parts and the inclosing-case shall be truly concentric, and by making said outer end wall as a separate plate it is practically impossible to accomplish this result.

One of the objects of my present invention is to form said outer end wall integral with the cylindrical body of the case, and when thus formed holes may be drilled therethrough in parallel with the inner cylindrical surface of the body and the difficulty thus overcome.

Furthermore, in said patent the opposite or inner end wall of said inclosing-case is made integral with the cylindrical body, and as it is intended to employ said end wall as a friction clutch-plate its inner side or face is formed with a flat friction surface. When made integral with the body it is very difficult to form a flat friction face on the inner side of said end wall; therefore another object of this invention is to make said end wall as a separate plate, in order that its inner side or face may be easily planed off, and an efficient friction surface produced.

In said patent the studs or pins bearing the pinions are supported at one end by the end wall of the inclosing-case, and at the other end by a plate, but in some instances, particularly in reversing-gearing of large dimensions, there is considerable strain on the pinions and gears with a liability of springing the studs which support them, and such torsional strain results in a clamping-action, which is decidedly disadvantageous.

Another object of this invention is to provide means in addition to the studs to hold the end supports for said studs against movement relative to each other, whereby this difficulty may be overcome.

In said patent clutch-mechanism is employed to connect the inclosing-case with the internal-gear, whereby said case is connected with the driven-shaft to serve as one of the intermediate members between the driving-shaft and the driven-shaft in order that said driven-shaft may be turned forward, and said clutch-mechanism is arranged outside of said case, and is not as powerful as is desired for reversing-gearing, of large dimensions; and another object of this invention is to improve the construction of the clutch-mechanism, aiming to produce a more powerful clutch-mechanism than the clutch-mechanism of said patent, and one which is concealed within the case. Said clutch-mechanism involves a plurality of friction clutch-plates arranged within the case between the end wall thereof and the crown of the internal gear, some of said plates being slidably connected with the case and others slidably connected with the internal-gear, and means to move them axially into and out of engagement.

In said patent the actuating-mechanism for the clutch-mechanism has a sliding cone on the driven-shaft, but in the case of reversing-gearing, of large dimensions, such construction is not easily operated, particularly when the cone is of a steep pitch, so that the actuating-lever has but a short stroke; and herein another object of the invention is to improve the construction of the actuating-mechanism whereby the leverage is so combined that the actuating-lever may be more easily moved. The improved actuating-mechanism involves a sleeve slidably mounted on the driven-shaft, which is connected by slotted links and pins with the pivoted operating-levers for the clutch-mechanism, the construction being such that when the parts are in neutral position the links will be arranged with their slots in parallel with the sleeve, whereby movement of the sleeve in one direction from neutral is permitted, without moving the links for the purpose of operating the brake-mechanism for the gearing, but when said sleeve is moved in the opposite direction from neutral said links will be moved to in turn move the pivoted-levers and operate the clutch-mechanism.

In said patent said actuating-mechanism is arranged to extend below the reversing-gearing and such arrangement is objectionable on account of the space occupied by it; and herein another object of the invention is to improve the construction of the actuating-mechanism whereby it is arranged above the reversing-gearing, so that this objection is overcome.

As the reversing-gearing is used particularly on motor-boats, and the like, I have herein provided a protecting shell for all of the operating-parts composed essentially of two parts, bolted together, each part having a hole through it at the end so that when the parts are bolted together said holes will be arranged in alinement to receive the bearings for the driving-shaft and the driven-shaft.

The invention also has for its object certain structural improvements in the brake-mechanism.

In the accompanying drawing.

As illustrated in said drawings, the driving-shaft $a$, spur-gear $a'$ secured to it, having at one side an elongated hub $a^2$, and at the other side a short hub $a^4$, said shaft terminating approximately flush with the end of said short hub $a^4$; the several pinions $b$ arranged about said spur-gear and in engagement therewith, four being here shown, and the studs $b'$, with bushings $b^3$ thereon, on which said pinions freely rotate, are all substantially as shown in said patent. Herein said studs $b'$ are fixed in the end wall $b^2$ of the inclosing-case, and said wall is formed integral with the cylindrical body $f$, of said case, instead of being made as a separate plate, as in the patent aforesaid; and the end wall $f'$ at the opposite end of said case is made as a separate plate instead of being formed integral with the body, as in said patent. By making the inclosing-case in this manner the center-hole for the driving-shaft and hub of the spur-gear and the holes for the studs $b'$ and such other holes as may be necessary, are more accurately located and more truly formed in parallel with the inner cylindrical surface of the body $f$, and as a result all the gear-parts, driving-shaft and case may be held concentric, and also the inner side or face of the plate $f'$ can be more easily planed off to form a flat friction face to engage an internally disposed friction clutch-plate.

The end wall $b^2$ is made very thick so as to afford a long bearing for the parts supported by it, and a bushing $f^3$ is preferably interposed between it and the hub $a^2$ of the spur-gear, which extends from side to side of it, and said bushing has formed on its inner end an outwardly extended flange which occupies a position between said wall $b^2$ and the spur-gear $a'$. At the opposite end of the spur-gear $a'$ a plate $c$ is located, which is mounted on the hub $a^4$, and is shaped to afford bearings for the ends of the fixed studs $b'$, which extend through and project beyond the pinions. The studs $b'$ are fixed to this plate as well as to the end wall $b^2$, and thus connect said plate and wall, but, in addition thereto shouldered pins 40, are provided at suitable points to connect said plate and end wall, two such pins being here shown. These pins are rigidly connected with the end wall and extend through holes in the plate, being arranged in parallel with the studs $b'$, and they act to hold said plate in fixed relative position to the end wall. Thus a frame or carrier for the pinions $b$ is formed, which is sufficiently rigid to resist torsional strains to which the pinions are or may be subjected.

The pinions $b$ also engage the teeth of an internal-gear $d$, having a hub $d'$, and said internal-gear is secured to the driven-shaft $e$, by headed pins $d^2$, $d^2$, which are extended through the hub, and into holes in the shaft. The driven-shaft $e$ terminates substantially flush with the inner face of the crown of the internal-gear. The internal-gear is adapted to be rotated by the pinions to rotate the driven-shaft $e$, either forward or backward, or said internal-gear may remain idle; as for instance, when the pinions are rotated about their axes in directions opposite to the direction of rotation of the spur-gear said internal-gear will be moved backward or in a direction opposite to the direction of rotation of the driving-shaft, and when said pinions are revolved about the axis of the driving-shaft $a$ with and by the spur-gear, in the same direction in which said spur-gear is rotating, said internal-gear will be moved forward or in the same direction in which the driving-shaft is rotating, and when said pinions are rotated about their axes and also revolved about the axis of the driving-shaft said internal-gear will remain idle.

The internal-gear loosely fits the cylindrical body $f$ of the inclosing-case, and said gear is free to rotate in said case or to turn with said case according to whether it is disconnected from or connected with said case, and herein improved clutch-mechanism is provided for connecting said internal-gear and case which is very powerful, but which may be easily operated, and which is entirely contained in the case and thereby concealed, and which may be operated upon or by an axial movement of the case relative to the internal-gear.

As here shown the end-wall $f'$ of the case, which is held by screws against the enlarged end of the cylindrical body $f$, has a center-hole through it which receives preferably a bushing mounted on the hub $d'$ of the internal-gear. Said end wall and parts connected therewith are free to move axially on said bushing or hub a very short distance, but sufficient to operate the clutch-mechanism, as will be described.

The clutch-mechanism comprises a plurality of axially movable annular clutch-plates arranged in a space between the end wall $f'$ and the crown of the internal-gear, and supported by the hub of said gear, although preferably arranged on a ring which is rigidly connected with said hub.

Figure 1:
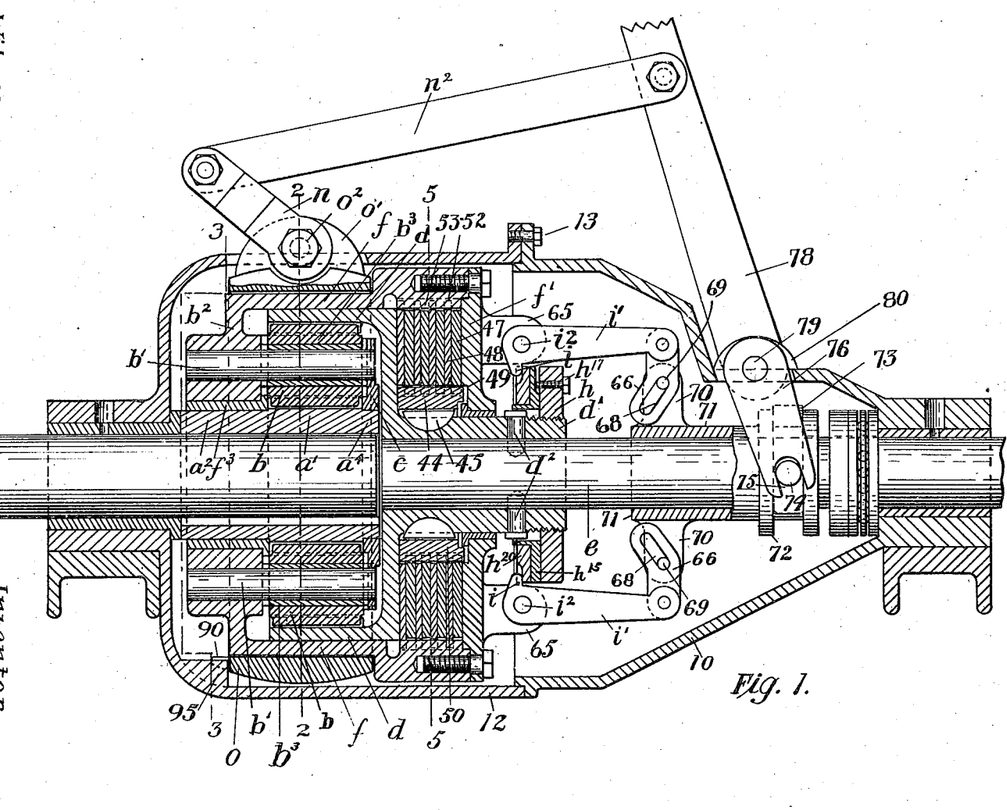
Figure 1 is a longitudinal vertical section of a reversing-gearing embodying this invention, the friction-clutch being clamped.
Figure 2:
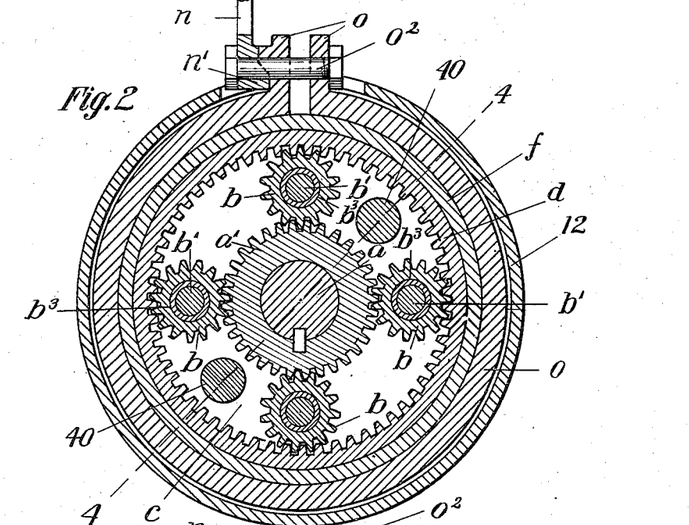
Fig. 2 is a transverse vertical section taken on the line 2—2 Fig. 1.
Figure 3:
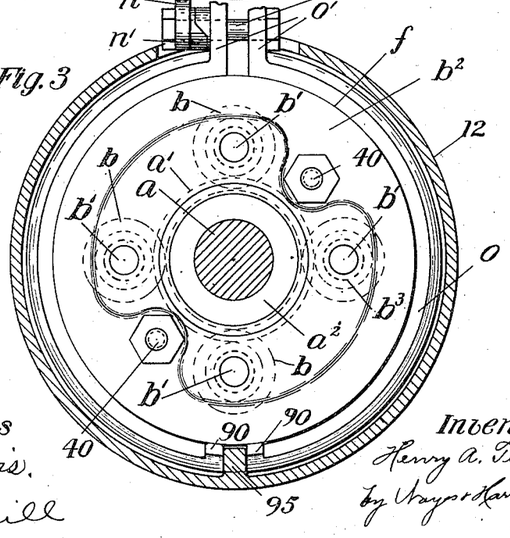
Fig. 3 is a transverse section taken on the line 3—3 Fig. 1.
Figure 4:
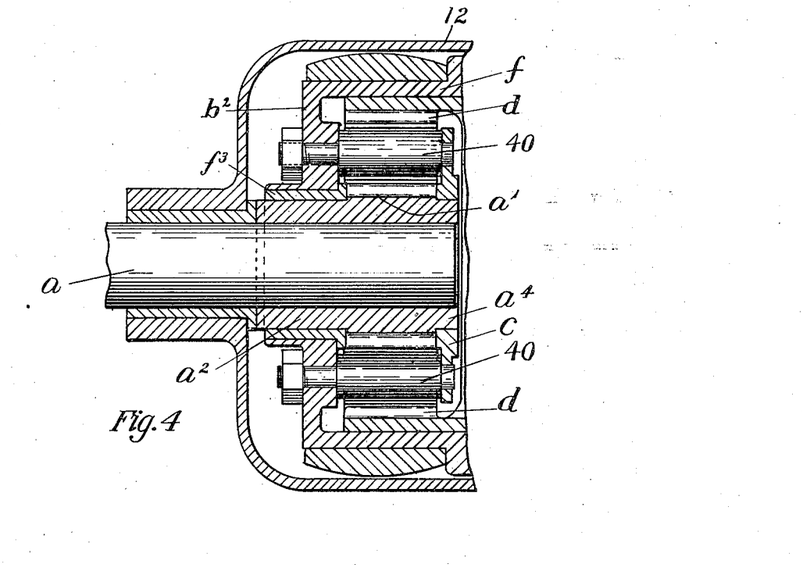
Fig. 4 is a longitudinal section of one end portion of the gearing taken on the line 4—4 Fig. 2.
Figure 5:
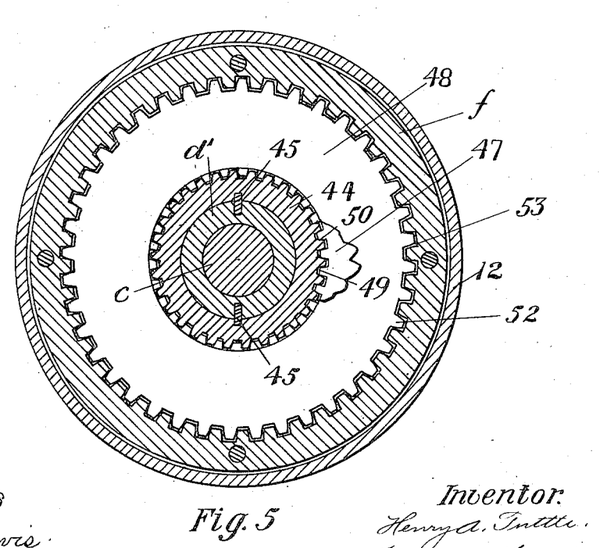
Fig. 5 is a transverse vertical section taken on the line 5—5 Fig. 1.

As here shown, the hub $d'$ of the internal-gear has a cylindrical portion next the crown of the gear upon which a ring 44 is mounted, which is secured against displacement by means of so-called "Woodruff" keys 45, or by other means. This ring supports the annular clutch disks or plates which are arranged thereon side by side, being loosely mounted and axially movable. Said plates are made as flat rings having both sides formed with frictional surfaces. One set 47 of clutch-plates is formed with teeth 49, on their inner edges, which are slidably received in correspondingly located grooves or keyways 50, formed in the exterior of the ring 44, and extended longitudinally thereof, and the other set 48 of clutch-plates is formed with teeth 52 on their outer edges which are slidably received in correspondingly located grooves or keyways 53, formed in the interior of the cylindrical portion $f$ of the inclosing-case, and extended longitudinally thereof. The plates 47 and 48 may be interspersed alternately, one set being thus caused to rotate with the case $f$, and the other set being caused to rotate with the internal-gear. Said plates are adapted to be clamped together between the end wall $f'$, and the opposing face of the crown of the internal-gear by endwise pressure upon them, to frictionally connect the inclosing-case with the internal-gear, and hence with the driven-shaft $e$, and when the pressure is relieved said case will be disconnected from the internal-gear and hence from the driven-shaft. To move the plates axially to bring them into and out of engaging position, as here shown, the case is moved axially, although the extent of movement is slight. To thus move said case axially means are connected with its end wall $f'$ adapted to be operated manually, and as shown in Fig. 1, a collar $h$ is threaded upon the hub $d'$, against an annular plate $h^{15}$, which is recessed at several places to receive a screw $h^{17}$ which projects from the inner face of the collar $h$, thus permitting adjustment of said plate, and said plate is provided with keyways to receive the squared heads of the pins $d^2$, and said plate is cut away on its side opposite the collar to receive a ring $h^{20}$, which is recessed at several places to receive the toes $i$, of levers $i'$, which are pivoted at $i^2$. The pivots $i^2$ are arranged on ears 65, formed on and extended outwardly from the end wall $f'$ of the inclosing-case. Pivotally connected to the outer bifurcated ends of said levers $i'$ are obtuse angled links 66, having diagonally extended elongated slots 68, which receive pins 69 extended laterally from ears 70, projecting from a sleeve 71, mounted loosely on the driven-shaft $e$ and adapted to slide longitudinally thereon. The sleeve 71 is formed with a grooved thrust collar 72, adapted to receive a yoke 73, having pins 74, extended outwardly from it in opposite ways, which enter notches 75, in the arms 76, of the actuating-lever 78, fulcrumed at 79, in ears 80 formed on and projecting from an outer protecting shell, which is provided for all of the revolving parts.

Movement of the actuating-lever 78 operates to slide the sleeve 71 along on the shaft $e$, to move the links 66, and in turn move the levers $i'$, and cause the toes of said levers to move in directions toward and from the ring $h^{20}$, and collar $h$, which form an adjustable abutment therefor, and to thus move the case axially in directions opposite to the movement of the sleeve.

Figure 6:
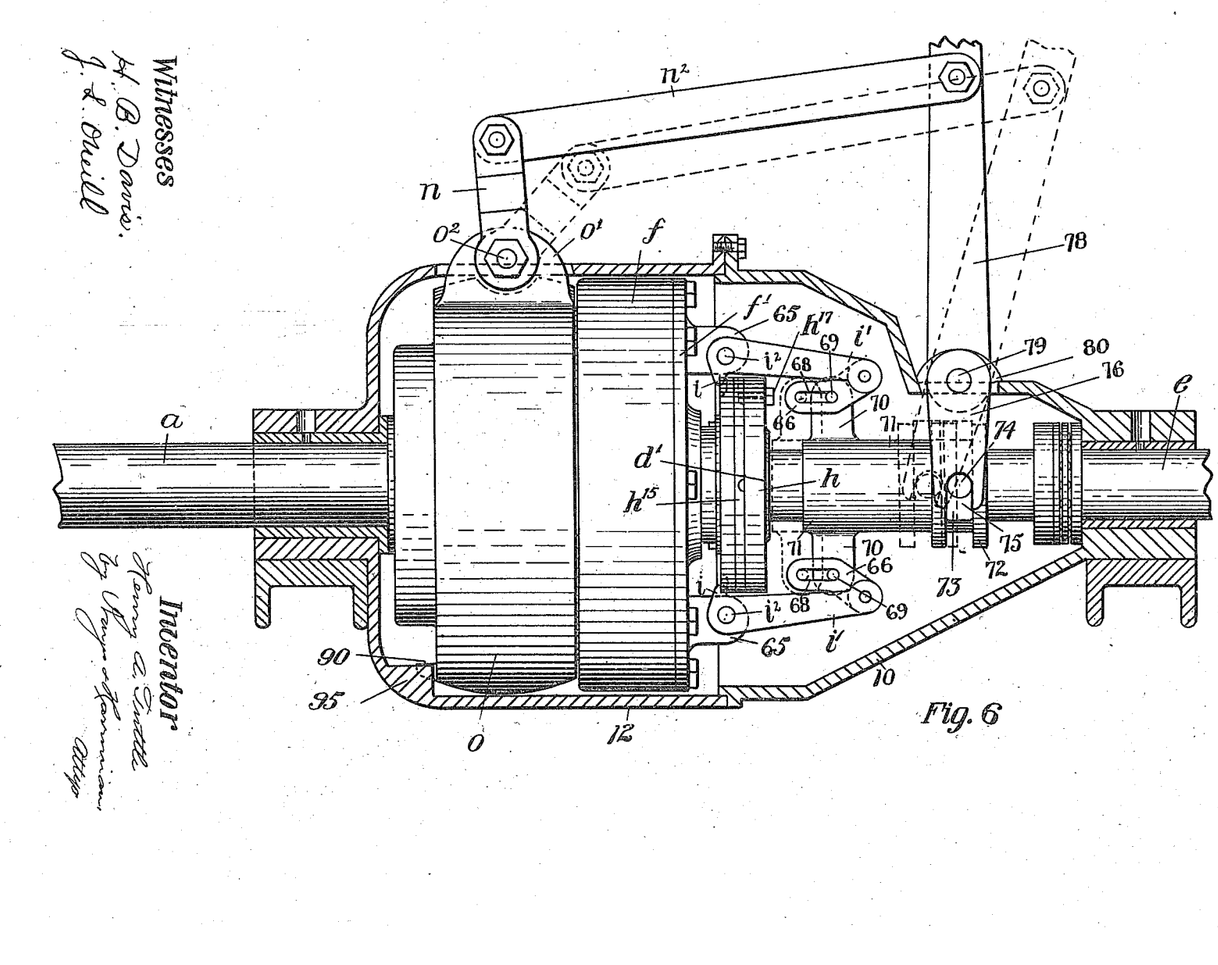
Fig. 6 is a side elevation and partial section illustrating particularly the operation of the actuating-mechanism for the clutch-mechanism and brake-mechanism.

With the parts in their neutral positions, as shown in full lines Fig. 6, the clutch-mechanism is disengaged and the slotted links 66 occupy positions with their slots disposed in parallel with the sleeve, and the pins 69 disposed at the inner ends of the slots. When the actuating-lever is moved into the position shown in Fig. 1, to engage the clutch mechanism the sleeve is moved in a direction toward the right from the neutral position shown in Fig. 6, and the pins 66 being at the inner ends of the slots in the links causes said links to move on their pivots into the position shown in Fig. 1, to move outward the ends of the pivoted levers $i'$, and cause the toes of said levers to engage the abutments and thus act to move axially the case in a direction toward the crown of the internal gear, and move the clutch-plates 47, 48, axially, thereby clamping said plates and the end wall of the cases and the crown of the internal gear together; and when the actuating-lever is returned to neutral position the levers $i$ will be released and the end wall $f'$ will be moved in the opposite direction to relieve the pressure upon the clutch-plates, and thereby permit them to disengage each other and the links will be moved into full line position Fig. 6. By slidably engaging some of the clutch-plates with the case, and others with the internal-gear, it will be observed that said plates are caused to rotate with the members which they slidably engage, yet they are permitted to be moved axially. This insures obtaining the full effect of the frictional surfaces of each clutch-plate, and of the frictional surface of each rotatable member which they slidably engage, and a very powerful clutch is produced which enables my device to be used in connection with a high speed engine of high horse-power.

The actuating-lever is pivoted above the thrust collar, and such arrangement enables the entire actuating-mechanism to be located above the gearing, instead of extending below it, as in the patent aforesaid.

It will be observed that the clutch-mechanism here shown, for the purpose of connecting the case and internal-gear is entirely concealed within the case, which prevents water, dust, etc., from coming in contact with its coöperative parts and interfering with its operation. As the reversing-gearing here shown is used particularly on motor-boats, such location and arrangement of clutch-mechanism is of importance, but, so far as I am aware, I am the first to construct a clutch-mechanism which is arranged between the case and internal-gear, and which is entirely concealed within the case, and adapted to be operated by an axial movement of the case relative to the internal-gear, hence, in this particular, I do not desire to limit my invention to the particular form of clutch-mechanism here shown.

As a brake-mechanism to engage the cylindrical case $f$, and hold it at rest or to disengage it and permit it to rotate, a band-brake is here shown, yet in lieu thereof any other form of brake-mechanism may be employed, so far as other features of my invention are concerned. As here shown, the band is composed of a resilient, split ring $o$, which embraces the cylindrical body $f$ of the case, and is provided at its ends with outwardly extended ears $o'$, $o'$, which project through an opening in the protecting-shell. The lower or middle portion of the ring $o$, is formed with a pair of laterally projecting lugs 90, which straddle a lug 95, located on the inside of the protecting shell, and thus keep the brake-band from rotating. To cause the brake-band to engage the case and restrain said case from rotation the ears $o'$, $o'$, are drawn toward each other. To accomplish this result the bolt $o^2$ which passes through said ears is made long enough to receive upon it an arm $n$, having a cam-faced boss $n'$, and said arm is arranged between the head of the bolt and one of the ears $o'$, which latter has a cam-faced boss thereon, so that the cam-faced boss on the lever engages the cam-faced boss on the contiguous ear, and said arm is adapted to be turned on the bolt as an axle and when so moved its cam-faced boss acts to move the contiguous ear toward the other ear and thereby draw the band into engagement with the case. Thus, by turning said arm in one direction the band is caused to engage the case and by turning it in the opposite direction the band is permitted to expand, the inherent spring action of the split-ring being sufficient to cause it to free itself from engagement with the case when the pressure is released. To move the arm $n$ back and forth for the purpose of operating the brake, it is connected by a link $n^2$ with the actuating-lever 78. When the actuating-lever is moved from neutral position toward the right, see dotted lines Fig. 6, said arm $n$ is moved to tighten the brake-band and during such movement the pins 69 move along in the slots 68 of the links 66.

The actuating-lever 78 is designed and intended to occupy three different positions, a right, a left, and an intermediate or neutral position. When moved to its extreme left position, as shown in Fig. 1, the driving-shaft will be connected with the driven-shaft to turn the latter in the same direction in which it is rotating; when moved into its intermediate or neutral position the driven-shaft will be disconnected from the driving-shaft and hence will remain at rest while the driving-shaft rotates; and when moved into its extreme right position the driven-shaft will be connected with the driving-shaft in such manner that it is rotated in a direction opposite to the direction of rotation of said driving-shaft.

In the first position above referred to, with the actuating-lever in its "left" position, as represented in Fig. 1, the end plate $f'$ of the case is moved into engagement with the clutch-plates 47, 48, which in turn are moved axially and clamped against the crown 39, thereby connecting the case to the internal-gear, which is connected to the driven-shaft $e$, as before stated and the brake-band is loosened, permitting the case to rotate freely. As the driving-shaft rotates, the pinions and internal-gear and case will all rotate with the spur-gear $a'$, the direction of rotation being the same as that of the spur-gear, hence the driven-shaft $e$ will be rotated in the same direction as the driving-shaft.

In the second position above referred to, with the actuating-lever in its neutral position, the clutch-plates are disengaged from the end-plate $f'$ and from the crown of the internal-gear, thereby disconnecting the case from the internal-gear and from the driven-shaft, and the brake-band is loosened permitting the case to rotate freely, independently of the internal-gear. As the driving-shaft rotates, the pinions revolve about the spur-gear, and also rotate about their axes in a direction opposite to the direction of rotation of said spur-gear, the case moves about the spur-gear with the pinions, the internal-gear remains at rest and consequently the driven-shaft will remain at rest while the driving-shaft rotates.

In the third position above referred to, with the actuating-lever in its "right" position, the clutch-plates are disengaged from the end-plate $f'$, and from the crown of the internal-gear, thereby disconnecting the case from the internal-gear and from the driven-shaft, and the brake-band is tightened about the case to thereby hold the case at rest. As the driving-shaft rotates, the pinions rotate about their axes but do not revolve about the spur-gear or about the axis thereof, and the internal-gear is rotated by said pinions in a direction opposite to the direction of rotation of the spur-gear, and the driven-shaft is thereby rotated in a direction opposite to the direction of rotation of the driving-shaft.

The rotating parts thus described are inclosed by a cylindrical protecting shell composed of two parts 10 and 12, which are separable transversely and adapted to be secured together by screws 13, which extend through abutting flanges on said parts. The two parts of said shell are arranged in alinement and each part has a hole through it at its outer end. The driving-shaft $a$ extends through the hole in the part 12, and the driven-shaft $e$ extends through the hole in the part 10. As shown in Fig. 1, the ends of said shell rest on the bed or frame of the engine.

No claim is made herein to the clutch plate and coöperating member, as such form the subject-matter of a divisional application filed by me February 18, 1915, Ser. No. 9,140.

I claim:—

1. In a reversing-gearing, the combination of a driving-shaft, a driven-shaft, gearing connecting said shafts including a spur gear on the driving-shaft and pinions engaging said gear and an internal gear on the driven-shaft, an axially movable inclosing-case for said gearing, said case bearing said pinions, means for holding said case against rotation to secure reverse drive, and clutching-means arranged for operation by an axial movement of said case to hold the component parts of the gearing against relative rotation and secure direct drive, substantially as described.

2. In a reversing-gearing, the combination of a driving-shaft, a driven-shaft, gearing connecting said shafts including a spur-gear on the driving-shaft and pinions engaging said spur-gear and an internal gear on the driven-shaft engaging said pinions, an axially movable inclosing-case for said gearing, said case bearing said pinions, clutch-mechanism arranged within said case to connect said case with one of the shafts for direct drive and to disconnect it therefrom, said clutch-mechanism being adapted for operation by an axial movement of said case, and means to hold said case against rotation for reverse drive, substantially as described.

3. In a reversing-gearing, the combination of a driving-shaft, a spur-gear thereon, pinions engaged by said spur-gear, an internal gear engaged by said pinions, a driven-shaft to which said internal-gear is secured, an axially movable inclosing-case for the gearing supported at one end by the driving-shaft and at the opposite end by the driven-shaft, having an end wall bearing said pinions, a clutch-mechanism arranged within said case to connect said case with and disconnect it from the driven-shaft, and means to move said case axially to operate said clutch-mechanism, substantially as described.

4. In a reversing-gearing, the combination of a driving-shaft, a spur-gear thereon, pinions engaged by said spur-gear, an internal-gear engaged by said pinions, a driven-shaft to which said internal-gear is secured, an axially movable inclosing-case for the gearing supported at one end by the driving-shaft and at the opposite end by the driven-shaft, having an end wall bearing said pinions, clutch-mechanism arranged between the opposite end wall of said case and the crown of the internal-gear to connect said case with and disconnect it from the driven-shaft, and means to move said case axially to operate said clutch-mechanism, substantially as described.

5. In a reversing-gearing, the combination of a driving-shaft, a spur-gear thereon, pinions engaged by said spur-gear, an internal-gear engaged by said pinions, a driven-shaft to which said internal-gear is secured, an axially movable inclosing-case for the gearing supported at one end by the driving-shaft and at the opposite end by the driven-shaft, having an end wall bearing said pinions, a plurality of axially movable friction clutch-plates arranged between the opposite end wall of said case and the crown of the internal-gear, and means to move said case axially to in turn move said clutch-plates thereby to connect said case with and disconnect it from the driven-shaft, substantially as described.

6. In a reversing-gearing, the combination of a driving-shaft, a spur-gear thereon, pinions engaged by said spur-gear, an internal-gear engaged by said pinions, a driven-shaft to which said internal-gear is secured, an axially movable inclosing-case for the gearing supported at one end by the driving-shaft and at the opposite end by the driven-shaft, having an end wall bearing said pinions, a plurality of axially movable friction clutch-plates arranged between the opposite end wall of said case and the crown of the internal-gear, some of said plates being in slidable engagement with the case and others in slidable engagement with the internal-gear, and means to move said case axially to in turn move said plates and thereby connect said case with and disconnect it from the driven-shaft, substantially as described.

7. In a reversing-gearing, the combination of a driven-shaft, a spur-gear thereon, pinions engaged by said spur-gear, an internal-gear engaged by said pinions, a driven-shaft to which said internal-gear is secured, an axially movable inclosing-case for the gearing having an end wall bearing said pinions, a plurality of axially movable friction clutch-plates arranged between the opposite end wall of said case and the crown of the internal-gear, some of said plates having teeth on their outer edges to enter longitudinal grooves in said case, and others having teeth on their inner edges to enter longitudinal grooves in the hub of the internal-gear, and means to move said case axially to correspondingly move the clutch-plates and thereby connect said case with and disconnect it from the driven-shaft, substantially as described.

8. In a reversing-gearing, the combination of a driving-shaft, a spur-gear thereon, pinions engaged by said spur-gear, an internal-gear engaged by said pinions, a driven-shaft to which said internal-gear is secured, an axially movable inclosing-case for the gearing supported at one end by the driving-shaft and at the opposite end by the driven-shaft, having an end wall bearing said pinions, clutch-mechanism to connect the case with and disconnect it from the driven-shaft, pivoted levers connected with the end wall of the case having toes adapted to engage an abutment and a sliding member to operate said levers to move said case axially and operate the clutch-mechanism, substantially as described.

9. In a reversing-gearing, the combination of a driving-shaft, a spur-gear thereon, pinions engaged by said spur-gear, an internal-gear engaged by said pinions, a driven-shaft to which said internal-gear is secured, an axially movable inclosing-case for the gearing supported at one end by the driving-shaft and at the opposite end by the driven-shaft, having an end wall bearing said pinions, clutch-mechanism to connect the case with and disconnect it from the driven-shaft, adapted for operation upon axial movement of said case, and means to move said case axially consisting of pivoted levers connected with an end wall of the case having toes adapted to engage an abutment, diagonally slotted links connected to said levers, a sliding sleeve on the driven-shaft having pins to enter the slots in said links, and means to slide said sleeve, substantially as described.

10. In a reversing-gearing, the combination of a driving-shaft, a driven-shaft, gearing connecting said shafts including gears secured to the shafts and intermediate pinions engaging said gears, a carrier for the pinions, a clutch arranged for operation by an axial movement of the pinion-carrier to hold the gearing against relative rotation of its component parts and secure forward drive, and a brake for arresting rotation of said pinion-carrier to secure reverse drive, which when disengaged therefrom permits axial movement thereof, substantially as described.

11. In a reversing-gearing, the combination of a driving-shaft, a driven-shaft, gearing connecting said shafts including a spur-gear on the driving-shaft, pinions engaging said gear and an internal gear on the driven-shaft, an axially movable inclosing-case for said gearing bearing the pinions, a brake movable into engagement with said case to hold it against rotation to secure reverse drive, which permits axial movement of said case when disengaged therefrom, and a clutch arranged for operation by an axial movement of said case to hold the gearing against relative rotation of its component parts and secure direct drive, substantially as described.

12. In a reversing-gearing, the combination of a driving-shaft, a driven-shaft, gearing connecting said shafts including a spur-gear on the driving-shaft, pinions engaging said gear and an internal gear on the driven-shaft, an axially movable inclosing-case for said gearing bearing the pinions, a brake movable into engagement with said case to hold it against rotation to secure reverse drive, which permits axial movement of said case when disengaged therefrom, a clutch arranged for operation by an axial movement of said case to hold the gearing against relative rotation of its component parts and secure direct drive, actuating-means for said brake, actuating-means for said axially movable case, and an operating-lever to which both said actuating-means are connected, substantially as described.

13. In a reversing-gearing, the combination of a driving-shaft, a spur-gear thereon, pinions engaged by said spur-gear, an internal gear engaged by said pinions having its crown formed with an external friction face, a driven-shaft to which said internal gear is secured, an axially movable inclosing-case for the gearing bearing said pinions and having an end wall formed with an internal friction face and one or more clutch rings arranged between said friction faces, and means to move the case axially to clamp the clutch rings between said opposing friction faces, substantially as described.

14. In a reversing-gearing, the combination of a driving-shaft, a spur-gear thereon, pinions engaged by said spur-gear, an internal gear engaged by said pinions having a crown with an external friction face, a driven-shaft to which said internal gear is secured, an axially movable inclosing-case for the gearing, one end wall of which bears said pinions and the opposite end wall of which is detachably connected with the body portion of the case and its inner side is formed with a friction face, axially movable clutch-rings arranged within said case between said opposing friction faces, some slidably connected with the gear and others slidably connected with the case, and means to exert endwise pressure upon the case to move the clutch rings axially and cause them to engage each other and the end rings to engage respectively said friction faces, substantially as described.

15. In a reversing-gearing, the combination of a driving-shaft, a spur-gear thereon, pinions engaged by said spur-gear, a pinion-carrier, a clutch-engaging plate borne by the pinion-carrier, an internal gear engaged by said pinions having a clutch-engaging end wall, a driven-shaft to which said internal gear is secured, and clutch rings arranged between and with their clutch-engaging faces in position for engagement with the clutch-engaging plate on the pinion-carrier and the clutch-engaging end wall on the internal gear, and means to move the pinion-carrier axially to clamp the clutch rings between said engaging members, substantially as described.

16. In a reversing-gearing, the combination of a driving-shaft, a driven-shaft, gearing connecting said shafts, means for holding said gearing against rotation as a whole to secure reverse drive, and means arranged for operation by an axial movement of one of the elements of said gear to cause the gearing to rotate as a whole for forward drive, substantially as described.

17. In a reversing-gearing, the combination of a driving-shaft, a driven-shaft, gearing connecting said shafts including gears secured to the shafts and intermediate pinions engaging said gears, a carrier for the pinions, means for holding said pinion-carrier against rotation to secure reverse drive, and means operated by an axial movement of said pinion-carrier to cause the gearing to rotate as a whole for forward drive, substantially as described.

18. In a reversing gearing, a driving-shaft, a driven-shaft, gearing connecting said shafts, comprising a brake-mechanism to secure reverse drive and a clutch-mechanism to secure forward drive, a slidable sleeve, means operatively connecting the sleeve with the brake-mechanism and clutch-mechanism, means for sliding said sleeve in one direction from normal to an abnormal position for operating the clutch-mechanism, the sleeve being slidable in the opposite direction from normal to an abnormal position, whereby the brake-mechanism will be operated without affecting the operative connection between the sleeve and the clutch-mechanism, substantially as described.

19. In a reversing gearing, a driving-shaft, a driven-shaft, gearing connecting said shafts, comprising brake-mechanism to secure reverse drive, clutch-mechanism to secure forward drive, an axially movable clutch-operating member, pivoted levers connected with the clutch-operating member, slotted links pivotally connected to said levers, a sliding-sleeve arranged on one of said shafts having pins adapted to travel within the slots of said links, means for sliding the sleeve in one direction from normal for moving the pivoted levers to operate the clutch-mechanism, and for sliding the sleeve in the other direction from normal, whereby the slotted links will be moved into and held in parallelism with one of the shafts, and the pins carried by the sleeve will travel within the slots of the links without affecting movement of the pivoted levers, thereby to operate the brake-mechanism, substantially as described.

20. A reversing-gearing including a driving-shaft, a driven-shaft, gearing connecting said shafts comprising brake-mechanism to secure reverse drive, clutch-mechanism to secure forward drive, an axially movable clutch operating member, a non-axially movable abutment, levers connected with the clutch-operating member and having toes adapted to engage the abutment, a sliding element, links connecting said levers with said element, means to move said element in one direction, whereby the levers will be operated through the links, to operate the clutch-mechanism, and means operatively connecting the aforesaid means with the brake-mechanism, whereby to apply the brake when said element is operated to disengage the clutch.

21. In a reversing gearing, a driving shaft, a driven shaft, gearing connecting said shafts comprising brake mechanism to secure reverse drive, clutch mechanism to secure forward drive, an axially movable clutch operating member, a non-axially movable abutment, levers pivotally connected with the clutch operating member and having projecting toes for coöperation with the abutment, links pivotally connected to the free ends of the levers, a sliding sleeve provided with ears, said links having obtuse angle portions formed with elongated slots, pins projecting from the ears and slidably seating in the slots, and a connection between the sleeve and brake mechanism, the pin and slot connection permitting movement of the sleeve to operate the brake mechanism without affecting the levers.

22. In a reversing-gearing, a driving-shaft, a driven-shaft, gearing connecting the shafts comprising brake-mechanism to secure reverse drive, a clutch-mechanism to secure forward drive, clutch operating means comprising link and lever-mechanism and a sliding sleeve, a connection between said sleeve and brake-mechanism, said sleeve when moved in one direction from normal operating through the link and lever-mechanism to set the clutch, and being permitted to move independently of the link and lever-mechanism in the opposite direction from normal when the brake-mechanism is being set.

23. In a reversing-gearing, a driving-shaft, a driven-shaft, gearing connecting said shafts, comprising brake-mechanism to secure reverse drive, and clutch-mechanism to secure forward drive, a slidable sleeve, means operatively connecting the sleeve with the brake-mechanism and clutch-mechanism, the operative connection with the clutch-mechanism comprising pivoted levers and slotted links loosely connected together, said sleeve being slidable in one direction from normal to operate the clutch-mechanism, and in the opposite direction from normal to permit operation of the brake-mechanism, the slots in the links admitting of the latter movement without affecting the operation of the clutch-mechanism.

24. In a reversing-gearing, a driving-shaft, a driven-shaft, gearing connecting said shafts, comprising brake-mechanism to secure reverse drive, and clutch-mechanism to secure forward drive, a slidable sleeve, means operatively connecting the sleeve with the brake-mechanism and clutch-mechanism, the operative connection with the clutch-mechanism comprising pivoted levers and slotted links loosely connected together, the slots of the links receiving pins on ears arranged on the sleeve, said sleeve being slidable in one direction from normal to operate the clutch mechanism, and in the opposite direction from normal to permit operation of the brake-mechanism, the slots in the links admitting of the latter movement without affecting the operation of the clutch-mechanism.

25. In a reversing-gearing, a driving-shaft, a driven-shaft, gearing connecting said shafts, comprising brake-mechanism to secure reverse drive, and clutch-mechanism to secure forward drive, a slidable sleeve, means operatively connecting the sleeve with the brake-mechanism and clutch-mechanism, the operative connection with the clutch-mechanism comprising pivoted levers and links pivotally connected thereto, said links having obtuse-angled portions formed with elongated slots, said sleeve being slidable in one direction from normal to operate the clutch-mechanism and in the opposite direction from normal to permit operation of the brake-mechanism, the slots in the links admitting of the latter movement without affecting the operation of the clutch-mechanism.

In testimony whereof, I have signed my name to this specification, in the presence of two subscribing witnesses.

HENRY A. TUTTLE.

Witnesses:
B. J. Noyes,
H. B. Davis.